(No Model.) 3 Sheets—Sheet 1.

F. P. STIKER.
APPARATUS FOR SEPARATING THE SOLID AND LIQUID PORTIONS OF STARCH REFUSE FROM EACH OTHER.

No. 327,345. Patented Sept. 29, 1885.

WITNESSES
Ed. A. Newman.
Al. C. Newman.

INVENTOR
Flavius P. Stiker.
By his Attorneys
Baldwin, Hopkins & Peyton

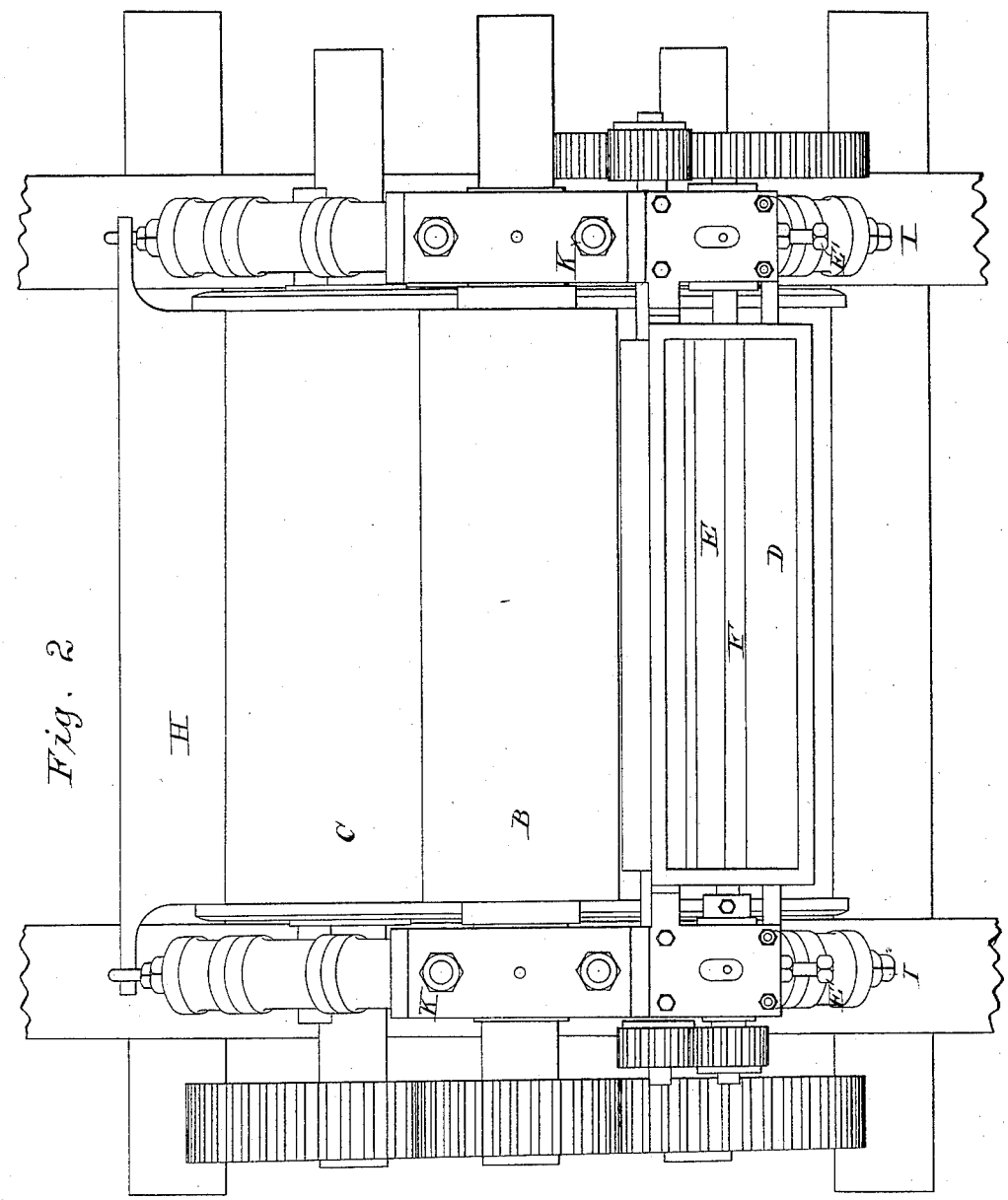

(No Model.) 3 Sheets—Sheet 3.

F. P. STIKER.
APPARATUS FOR SEPARATING THE SOLID AND LIQUID PORTIONS OF STARCH REFUSE FROM EACH OTHER.

No. 327,345. Patented Sept. 29, 1885.

WITNESSES
Ed. A. Newman.
Al. C. Newman.

INVENTOR
Flavius P. Stiker.
By his Attorneys
Baldwin, Hopkins & Peyton.

UNITED STATES PATENT OFFICE.

FLAVIUS P. STIKER, OF OSWEGO, NEW YORK, ASSIGNOR TO THOMSON KINGSFORD, OF SAME PLACE.

APPARATUS FOR SEPARATING THE SOLID AND LIQUID PORTIONS OF STARCH REFUSE FROM EACH OTHER.

SPECIFICATION forming part of Letters Patent No. 327,345, dated September 29, 1885.

Application filed May 29, 1885. (No model.)

*To all whom it may concern:*

Be it known that I, FLAVIUS P. STIKER, of Oswego, in the county of Oswego and State of New York, have invented certain new and useful Improvements in Machinery for Separating the Solid and Liquid Portions of Starch Refuse from Each Other, of which the following is a specification, reference being had to the accompanying drawings, in which—

Figure 1:
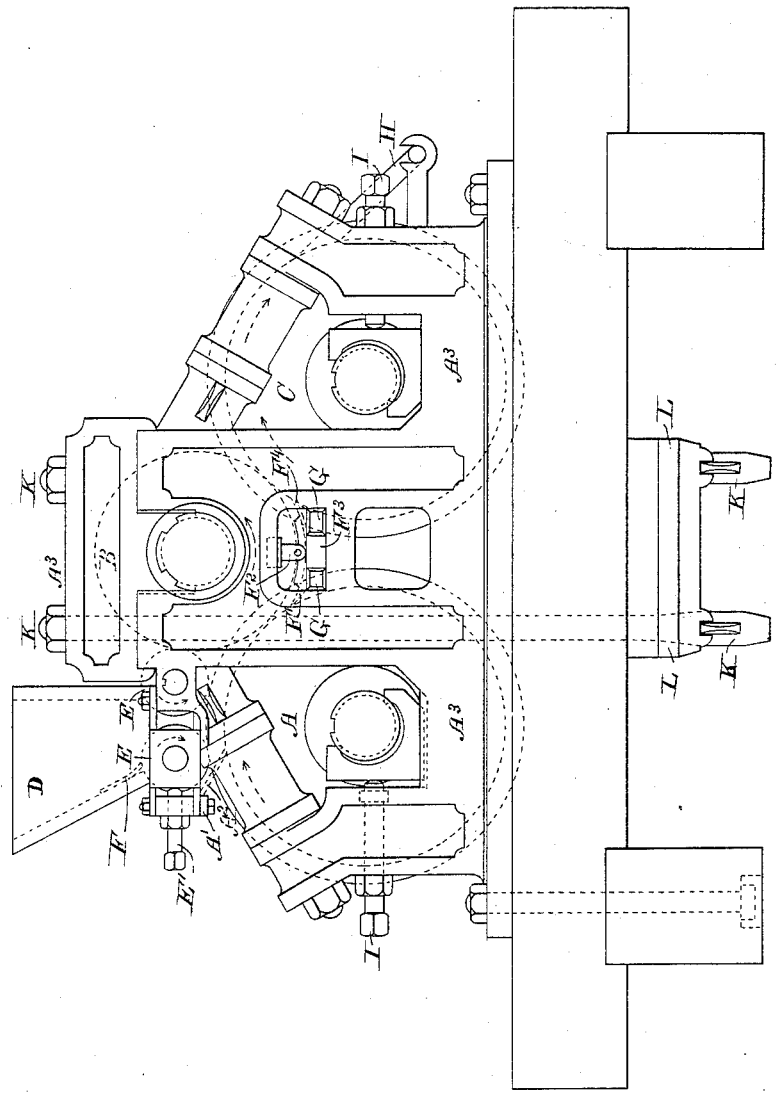
Figure 4:
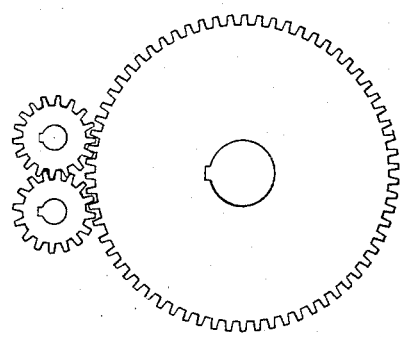
Figure 6:
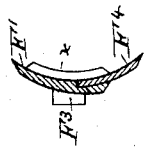
Figure 3:
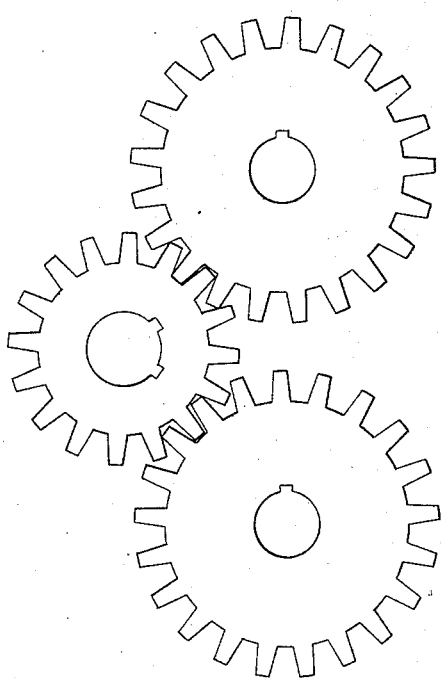
Figure 5:
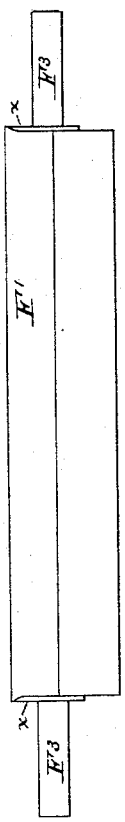

Figure 1 is a side elevation of my improved machinery. Fig. 2 is a plan or top view; Fig. 3, a view of the main roller-gearing detached; Fig. 4, a view of the feed-roller gearing detached; Fig. 5 a plan view, and Fig. 6 a sectional view, of a scraper detached.

The structure and organization of my machine are such as to reduce the number of squeezing-rolls to the minimum necessary to effectually squeeze and separate the solid and liquid portions of starch refuse. I employ but three main squeezing-rollers, two of them perforated and on the same horizontal plane, while the third is solid, and above and partially between them. I thus get the effect at reduced cost and increased convenience of two pairs of rollers. The first of the perforated rollers I place directly under the hopper, and the feed is direct and continuous from one pair of rollers to the other without special moving feed mechanism entirely through the apparatus, which is compact and economical to construct, and works better than if made otherwise.

Referring to the letters upon the drawings, $A^3$ indicates the main frame for supporting the apparatus. Suitably mounted in this frame are three hollow squeezing-rollers, A B C, the upper one, B, having a solid unbroken surface, and the two lower rollers, A and C, being perforated.

D indicates a hopper properly supported above the roller A, and adapted to receive starch refuse. The refuse is fed down between two feeding-rollers, E E, which revolve toward each other, as usual with such feeding-rollers at the bottom of a hopper. One of these feed-rollers is provided with adjustable bearings movable horizontally on their supports by means of adjusting-screws E′ in the ordinary way.

F indicates a guard of leather, rubber, or any other suitable material, which is attached to the inclined side of the hopper and impinges upon one of the feed-rollers E, as illustrated, to aid in delivering the refuse between the two feed-rollers. Passing down between the feed-rollers, in which operation the refuse is squeezed and compressed, it falls upon the surface of the large perforated roller A, the liquid passing through the perforations of the roller and down into any suitable receptacle or conveyer. (Not here illustrated.)

A′ indicates a bar to which is secured a rubber or leather apron, $A^2$, which keeps the solid portions of the refuse from going the wrong way and sliding off from the roller A. The solid portions are carried forward by the motion of the roller A, and are again squeezed and compressed between the rollers A and B, further extracting their liquid contents.

F′ indicates a scraper held down by screw-studs $F^2$, to clear the roller A, which is made adjustable by means of wedges G G, so as to be kept in proper position to do its work. This scraper is provided with a rubber or leather apron, $F^4$, which drags on the roller C, and the scraper and apron, supported by a cross-bar, $F^3$, serve to prevent the refuse from falling between the rollers A and C. The flanges $x$ on the ends of the scraper serve to prevent the refuse from escaping at the ends.

The mass after being squeezed a second time passes on between rollers B and C, and is again squeezed and compressed, the liquid dropping down through the perforations of roller C, as before, and thence the solid portions are carried over the surface of roller C and delivered as dry feed for cattle.

H indicates a scraper for clearing the surface of the roller C.

Rotary motion may be communicated to the train of rollers by any ordinary means, as, for instance, a main driving-shaft, (not here illustrated,) which can be geared with either one of the three main rollers A B C in any ordinary manner. At opposite sides of the main frame of the machine there are gear-wheels, as illustrated, properly connecting the train, so that the motions of the rollers will all be in the directions indicated by the several arrows, so as to convey the starch refuse in the proper direction from roller to roller, as above explained. I do not describe this gearing in detail, because it is all of ordinary character. It is simply adopted as suitable for the purpose, and is no part of my invention, except as mere connecting mechanism old in itself.

The lower rollers, A and C, are adjustable to and from each other by means of set-screws I I, which move the bearings of the roller-shafts on their supports, as desired. The journal-bearings of the upper roller, B, are held firmly down in place by means of two pairs of heavy bolts, K K. These bolts are provided with rubber washers L at their lower ends, so as to allow of a certain spring yielding of the upper roller, B, and are keyed in place underneath the machine-frame, as shown. This yielding capacity of the upper roller, B, decreases the liability of the machinery to break under heavy strain, and tends to equalize the pressure of the refuse when unevenly distributed.

It would be possible to use my apparatus without feeding-rollers in the hopper, but it is preferable to employ them. It would also be possible to make various formal variations in the construction of the machine as a whole without departing from the substance of my improvements, and I therefore do not intend to limit my invention to the details herein specified.

I am aware that it is not new to separate the solid and liquid portions of starch refuse by means of a machine containing a feed-hopper and squeezing-rollers and scrapers or cleaners for the rollers. Machines of this class are shown, for example, in United States Patents No. 254,240 and No. 296,000, and I do not claim, broadly, such a machine; but

What I claim as new, and desire to secure by Letters Patent of the United States, is—

1. In a machine for separating the solid and liquid portions of starch refuse, the combination, with a main frame, of the hopper and feeding-rollers, the three squeezing-rollers A B C, the two lower ones being perforated, the roller A being located directly under the hopper, all the rollers being graded together, so as to rotate as indicated, and the scrapers for cleaning the rollers, and the aprons for preventing the escape of the refuse, substantially as set forth.

2. In a machine for separating the solid and liquid portions of starch refuse, the combination, with a main frame, of the hopper and feeding-rollers, one of which is adjustable, the squeezing-rollers A B C, the rollers A and C being adjustable and perforated, the roller A being located directly under the hopper, all the rollers being geared together, so as to rotate as indicated, and having the scrapers and aprons, substantially as set forth.

3. In a machine for separating the solid and liquid portions of starch refuse, the combination of the three squeezing-rollers A B C, the roller A being located directly under the hopper, the rollers A and C being perforated and adjustable, and provided with scrapers and aprons, as described, and geared together, and adapted to receive, squeeze, and deliver the solid portions and separate the liquid portions, substantially as set forth.

4. In a machine for separating the solid and liquid portions of starch refuse, the combination, with a main frame, of the hopper and feeding-rollers, the three squeezing-rollers A B C, the roller A being located directly under the hopper, the two lower ones being perforated and adjustable, and the bearings of the upper roller being made yielding by means of rubber cushions or springs, substantially as set forth.

In testimony whereof I have hereunto subscribed my name.

FLAVIUS P. STIKER.

Witnesses:
WILLIAM V. BURR,
CHAS. A. BENTLEY.